US 8,576,226 B2

(12) United States Patent
Ford et al.

(10) Patent No.: US 8,576,226 B2
(45) Date of Patent: Nov. 5, 2013

(54) TERTIARY LIGHTING SYSTEM

(75) Inventors: Adam William Ford, Eagle Mountain, UT (US); John-Paul Ownby, South Jordan, UT (US)

(73) Assignee: Disney Enterprises, Inc., Burbank, CA (US)

(*) Notice: Subject to any disclaimer, the term of this patent is extended or adjusted under 35 U.S.C. 154(b) by 1018 days.

(21) Appl. No.: 12/326,445

(22) Filed: Dec. 2, 2008

(65) Prior Publication Data

US 2010/0134492 A1 Jun. 3, 2010

(51) Int. Cl.
*G06T 15/50* (2011.01)
*G06T 15/60* (2006.01)

(52) U.S. Cl.
USPC .......................................... 345/426

(58) Field of Classification Search
USPC .......................................... 345/426
See application file for complete search history.

(56) References Cited

U.S. PATENT DOCUMENTS 5,966,134 A * 10/1999 Arias ........................... 345/589

OTHER PUBLICATIONS

J.Escoda; Blending Reality: cartoon looking renders of 3D scence; 2006.*

Card et al.; Non-Photorealistic Rendering with Pixel and Vertex Shaders; in ShaderX: Vertex and Pixel Shader Tips and Tricks; Wordware, May 2002.*

Ebert et al.; Volume Illustration: Non-Photorealistic Rendering of Volume Models; Proceedings of IEEE Visualization '00, pp. 195-202; 2001.*

Lum et al.; Hardware-Accelerated Parallel Non-Photorealistic Volume Rendering; NPAR'02 Proceedings of the 2nd International Symposium on Non-photorealistic Animation and Rendering; ACM, New York 2002.*

* cited by examiner

*Primary Examiner* — Carlos Perromat
(74) *Attorney, Agent, or Firm* — Dorsey & Whitney LLP

(57) ABSTRACT

One particular implementation of the present invention may take the form of a method and system for adding an intermediate color to a computer-rendered object or scene to provide a more dynamic quality to the graphic. The method may add an additional, or tertiary, color to a computer graphic object or scene such that the tertiary color may be blended with a light source color based on calculated surface normals of the pixels of the object in relation to the location of the light source. The blending of the intermediary color with the color of the inserted light source may provide the graphic with a more painterly look giving the graphic or scene a more dynamic feel to a viewer. Another implementation may allow the amount of intermediate color blended into each pixel to be adjusted manually by a graphic designer to achieve a desired look to the object or scene.

22 Claims, 4 Drawing Sheets

TERTIARY LIGHTING SYSTEM

FIELD OF THE INVENTION

Aspects of the present invention relate to computer graphics. More particularly, aspects of the present invention involve a system and method for adding an additional or intermediate color to a computer graphics object or scene to provide a more dynamic quality to the graphic.

BACKGROUND

Computer graphics are used in a variety of formats and may include almost everything on a computing device that is not text or sound. From graphical interfaces to video games and movies, computer graphics provide a computer-rendered visual representation of an object or scene to a viewer or user. Computer graphics may come in the form of a single object or a collection of objects set against a computer-rendered background to create a computer graphic scene. The objects and background of a computer-rendered scene may also include several techniques to provide the scene with a more realistic or pleasing look.

The goal of many computer graphic designers is to provide a computer-rendered graphic or scene that is aesthetically pleasing to a viewer. To provide the more realistic or pleasing look to a computer graphic scene, several rendering and lighting techniques have been developed. These techniques may include 3D projection, ray tracing, shading and texture mapping. Such techniques perform mathematical calculations on the computer graphics to adjust the color and intensity of the pixels of the graphic or scene to give the sense of lighting and detail to the rendered objects. The artificial lighting and rendering of the objects and background of a scene may provide a more realistic or enjoyable look to the computer-rendered objects.

Typical lighting or rendering techniques may provide the effect of several artificial lights within the computer graphic scene. For example, a computer graphic scene may include a directional or point light source to light the objects of the scene from a particular direction and an ambient light source to provide definition to the objects. These techniques provide the effect of lighting upon the objects and background of a scene. These effects may provide definition and realism to the computer graphic. However, traditional lighting techniques may appear flat and artificial to some viewers of the graphic.

SUMMARY

One embodiment may comprise a method for applying color to a computer-rendered object. The method may comprise calculating the surface normal of a first pixel of the computer-rendered object in relation to a location of a light source, applying a first color to the first pixel with the first color indicative of the color of the light source and blending a second color with the first color in the first pixel based on the calculated surface normal.

Another embodiment may comprise a system for coloring a computer-rendered object or scene. The system may comprise a machine-readable medium having stored thereon data representing sequences of instructions. The sequences of instructions, when executed by a processor, cause the processor to perform operations comprising applying a light source to the object or scene with the light source configured to color a first pixel of the object or scene a first color, calculating the surface normal of the first pixel in relation to the location of the light source and blending a second color with the first color in the first pixel based on the calculated surface normal.

Still another embodiment may comprise a computer-readable storage medium. The computer readable storage medium may store a computer-executable code that, when executed by a computer, causes the computer to display a computer-rendered object. Further, the computer-rendered object may be colored through the operations of calculating the surface normal of a first pixel of the computer-rendered object in relation to a location of a light source, applying a first color to the first pixel, the first color indicative of the color of the light source and blending a second color with the first color in the first pixel based on the calculated surface normal.

DETAILED DESCRIPTION

One particular implementation of the present invention may take the form of a method or system for adding an intermediate color to a computer-rendered object or scene to provide a more dynamic quality to the graphic. The method may add an additional, or tertiary, color to a computer graphic object or scene such that the tertiary color may be blended with a light source color based on calculated surface angles of the pixels of the object in relation to the location of the light source. The blending of the intermediary color with the color of the inserted light source may provide the graphic with a more painterly look giving the graphic or scene a more dynamic feel to a viewer. Another implementation may allow the amount of intermediate color blended into each pixel to be adjusted manually by a graphic designer to achieve a desired look to the object or scene.

Figure 1:
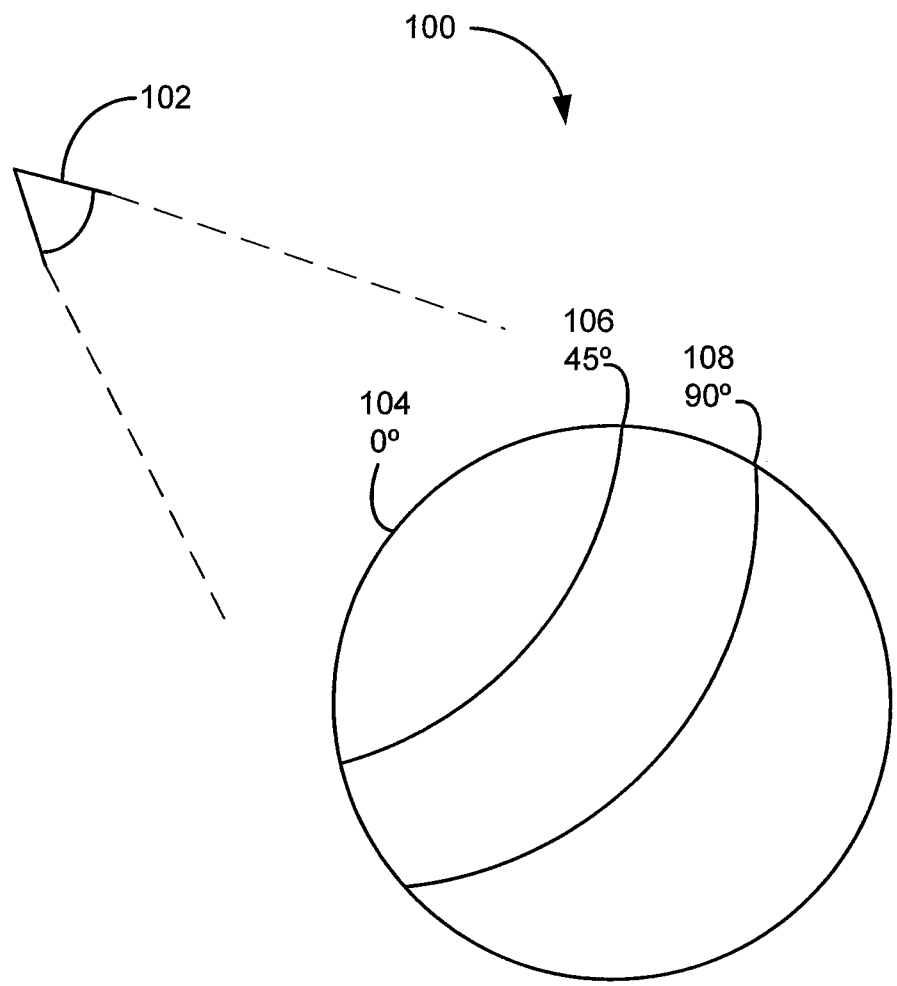
FIG. 1 is a diagram illustrating a first embodiment of a lighting technique including an intermediate color applied to a ball-shaped computer graphic.

FIG. 1 is a diagram illustrating a first embodiment of a lighting technique including an intermediate color applied to a ball-shaped computer graphic. The intermediate color may be blended with the color of the point light 102 on the graphic to add a more dynamic look to the ball 100.

To provide the effect of a light shining on the ball 100, a point light may be selected by the graphic designer and applied to the ball 100 at a 45 degree angle. It should be appreciated, however, that the point light is not an actual light, but is a typical shading technique that alters the color and intensity of some of the pixels of the graphic to give the illusion of a light shining on the object. Typically, the effect of a point light 102 is achieved by a designer utilizing a computer rendering engine to select and insert the light into the computer graphic environment. The rendering engine may achieve the lighting effect by calculating the angle of the surface normal of each pixel of the object to the selected location of the point light source 102 and adjusting the color and intensity of each pixel accordingly. For example, a surface normal of a pixel of the object 100 that is parallel to the angle of the light source 102 may be rendered by the rendering engine to include the color of the point light with a high intensity or brightness. Surface normals of pixels of the object that are perpendicular to the point light 102 may include the color of the point light, but at lower intensity. Further, surface normals of pixels of the ball 100 that point away from the point light source 102 may not receive any color at all from the light source. Instead, these pixels may be colored with an ambient lighting technique. This method of altering the color and intensity of each pixel of the object may provide the effect to the graphic of a light source shining on the object from a particular point. Other types of light sources may provide separate lighting effects on a computer graphic or scene.

To further add to the lighting effect, an ambient lighting technique may also be used on the computer graphic or in the graphic scene. The ambient light is a base color that may be added equally across the entire graphic or scene to provide a general luminescence. For example, a rendering engine of a graphic scene may first give the scene a general bluish-gray color, applied equally to all objects. Pixels of an object 100 with surface normals that point away from a point light 102 may not include the color of the point light. However, if the point light 102 is the only light source in the graphic scene, those pixels where the surface normal points away from the light would include no color. To provide some color and definition to the unlit pixels, an ambient light technique may be applied to the object or scene. Thus, the surface pixels receiving no light from the point light 102 may be colored in accordance with the ambient light technique such that the viewer may distinguish the shape of the object.

Returning to FIG. 1, the ball graphic 100 presented may include the techniques described above to shade the object. Thus, the ball 100 may be shaded and rendered to give the effect of a point light 102 shining on the ball at a 45 degree angle. Also, the ball may include an ambient lighting technique to define those pixels that may not be colored by the point light 102. Further, an additional lighting technique may be included to blend a tertiary or intermediate color to those pixels that include the color of the point light 102.

The position of the point light 102 may provide a reference from which the pixels of the ball 100 may be colored and shaded. Thus, the color and intensity attributed to each pixel of the ball 100 may relate to the surface angle of each pixel to the point light 102. For example, the pixels at position 104 may have surface normals that are parallel to the point light 102, or 0 degrees. In one embodiment, these pixels may be colored the same color as the point light 102. Thus, if a yellow point light 102 is provided, the pixels at position 104 may be colored yellow. Further, the surface normal of each pixel may determine the intensity or brightness of the color applied to each pixel. In one example, the pixels where the surface normal is parallel to the light source 102 at position 104 may be shaded with the highest intensity of light. Thus, the pixels at position 104 may be a bright yellow color.

As the pixels that make up the ball 100 begin to angle away from the point light 102, the intensity of the color applied to each pixel may be lessened. For example, moving from position 104 to position 106, the surface normal of the pixels of the ball 100 begin to angle away from the point light 102. At position 106, for example, the surface normals of the pixels may equal 45 degrees. Further, the intensity of the color of the pixels may be lessened as the angle of the surface normal of each pixel angles away from the light source 102. Thus, at position 106, the intensity of the color applied to each pixel may be less than that applied to pixels at position 104. Similarly, the pixels at location 108 may have even less intensity as those in position 106, as the surface normal of the pixels at this position are roughly perpendicular to the light source 102, or 90 degrees. These pixels may have the least amount of intensity applied by the rendering program. Thus, the pixels in position 108 are the least brightest, having a muted color to them.

The color applied to each pixel may be similar to that of the light source 102. For example, if the light source 102 provided is a yellow light source, the pixels of the ball may be colored yellow to match the light source. However, the intensity of the yellow color applied to each pixel may be apportioned as described above. Thus, those pixels located at position 104 may be a bright yellow while the pixels near position 108 may be a softer or less bright yellow. The light source 102 may be any color desired by the computer designer. Further, the color applied to each pixel does not have to be the same color as the light source 102. Instead, each pixel may be colored any color as desired by the computer designer.

An ambient lighting technique may also be provided to add definition to a computer graphic. In the ball 100 of FIG. 1, ambient light may be used to color the pixels of the half of the ball that faces away from the point light 102. Thus, the pixels of the ball 100 in area 110 may be colored in accordance with an ambient light source. In one example, the pixels may be colored a greyish or purple color to provide the look of that half of the ball 100 being in shadow. However, any color may be used as the ambient light as decided by the designer of the graphic.

In addition to the colors of the point light and the ambient light described above, a third color may be added to the graphic to provide more definition and feel to the ball 100. In one embodiment, a tertiary or intermediate color may be blended with the color of the point light 102. For example, the pixels of a computer graphic may be colored yellow to reflect the selection of a yellow point light 102 by the computer graphic designer. However, the pixels may also include a intermediate color, such as an orange color, that may be blended with the yellow of the light source 102. The orange and yellow blend may provide a more painterly look to the ball 100 graphic. The color of the tertiary color and the point light may be any color chosen by the graphic designer. Further, the blending of the orange color with the yellow may be provided in response to a calculated surface normal of each pixel to the point light 102. For example, as the surface normal of each pixel of the ball 100 decreases, the color of the pixel may shift from a pure yellow to a pure orange. Thus, pixels near position 104 may be a solid yellow color while pixels near position 108 may be a pure orange color. Pixels between these two surface normals may contain a blend of both yellow and orange. The percentage of yellow and orange blended in each pixel may relate to the calculated surface normal. Thus, the ball 100 may appear to blend from a pure yellow to a pure orange as the pixels angle away from the point light 102, moving from position 104 to position 108. Further, on the bottom half of the ball 100, the pixels may maintain the ambient color as described above with no blending of the intermediate color. Alternatively, the intermediate color may also be blended with the ambient color of the pixels in area 110. The combination of the point light color, ambient color and tertiary color may provide the ball 100 with a more painterly look that may be desirable to some viewers of the graphic.

In a similar manner, the techniques described above may be applied to an entire computer graphic scene. Thus, several objects and background features of a scene may include the coloring and shading that indicates a point light source. The color and intensity applied to each pixel of the objects and background may correlate to the surface normal of each pixel to the location of the point light. Further, the pixels that point away from the point light may be colored using an ambient lighting scheme. Finally, each pixel colored by the point light may also include a tertiary color that is blended into the color of the point light. Thus, the tertiary color technique described above may be applied to each object of a computer graphic scene, as well as the features of the background of the scene.

Figure 2:
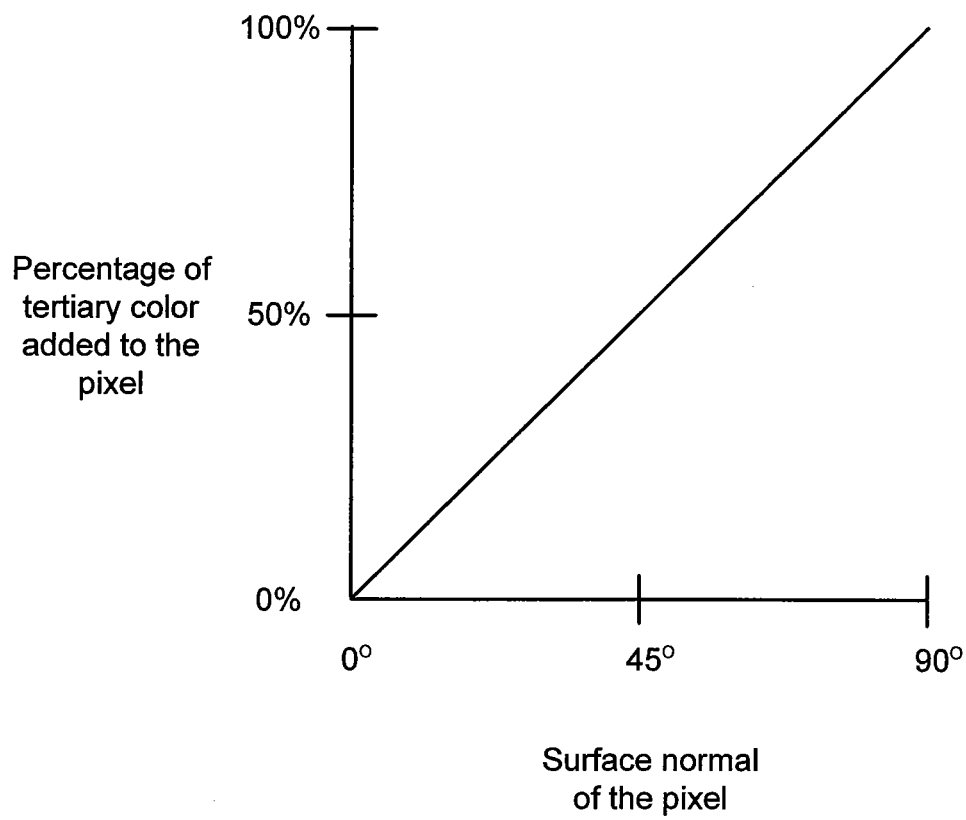
FIG. 2 is graph illustrating the percentage of an intermediate color applied to a computer graphic or scene in relation to the angle of the surface of the pixels of the graphic to the light source in one embodiment of the lighting technique.

FIG. 2 is graph illustrating the percentage of an intermediate color applied to a computer graphic or scene in relation to the angle of the surface of the pixels of the graphic to the light source in one embodiment of the lighting technique. The graph presented in FIG. 2 may be just one example of blending a tertiary or intermediate color with a point light color within the pixels of a computer graphic. For example, each pixel may contain the same percentage of the point light color and the tertiary color regardless of the surface normal of each pixel. Generally, the amount of tertiary color applied to each pixel of the graphic or scene in relation to the surface normal of the pixel may take any formed desired by the computer graphic designer.

In the graph of FIG. 2, the vertical axis of the graph represents the percentage of a tertiary or intermediate color that may be represented in a pixel of a computer graphic or scene. The amount of tertiary color blended into a pixel may range from 0% to 100% of tertiary color. For example, a computer graphic may utilize a point light technique to provide a yellow light on the graphic. A yellow color may be applied to the pixels of the graphic to represent the yellow point light. In an embodiment using a tertiary color, a separate color may be blended with the yellow color of the pixels of the graphic. For example, an orange tertiary color may be blended into the yellow color in the pixels of the graphic. Thus, applying the above example to the graph of FIG. 2, at 0% tertiary color, a pixel may be a solid yellow. As the percentage of tertiary color blended into a pixel increases (ie. moving up the vertical axis), the color of the pixel may begin to blend in the tertiary orange color until the pixel is a solid orange color at the top of the vertical axis. Thus, the vertical axis represents all combinations of the blending of the yellow point light color and the tertiary orange color in a pixel of a computer graphic.

The horizontal axis of the graph of FIG. 2 represents the surface normal of a pixel to the selected location of a point light. At a 0 degree surface normal, a pixel of the computer graphic is parallel to the location of the point light. Moving along the horizontal access, the surface normal of the pixel to the point light increases until the surface normal is perpendicular to the point light at 90 degrees.

As represented by the graph line 210 of the graph 200, the percentage of tertiary color blended into a particular pixel of a computer graphic may be directly related to the surface normal of the pixel to the point light. Thus, as the surface normal of the pixel in relation to the location of the point light increases from being parallel to perpendicular, the percentage of tertiary color blended into the pixel may also increase from a 0% blend to a 100% blend. Thus, when the surface normal of a pixel is parallel to the point light, the pixel may be colored to match the color of the point light. In the above example, these pixels may be a solid yellow. When the surface normal is 45 degrees in relation to the point light, the pixel may be a 50-50 blend of the tertiary and point light color. Thus, in the above example, these pixels may be a 50-50 blend of yellow and orange. Finally, when the surface normal of the pixel is 90 degrees, or perpendicular to the angle of the point light, the pixel may include 100% tertiary color. Thus, in the above example, these pixels may be a solid orange color. Therefore, in this embodiment, the percentage of tertiary color blended into a pixel of a computer graphic may be directly related to the surface normal of the pixel to the point light. The graph of FIG. 2 illustrates one example of blending a tertiary color to the pixels of a graphic in relation to the surface normal of the pixel to the location of a point light. However, the relation between the surface normal and percentage of tertiary color blended may take any form.

Figure 3:
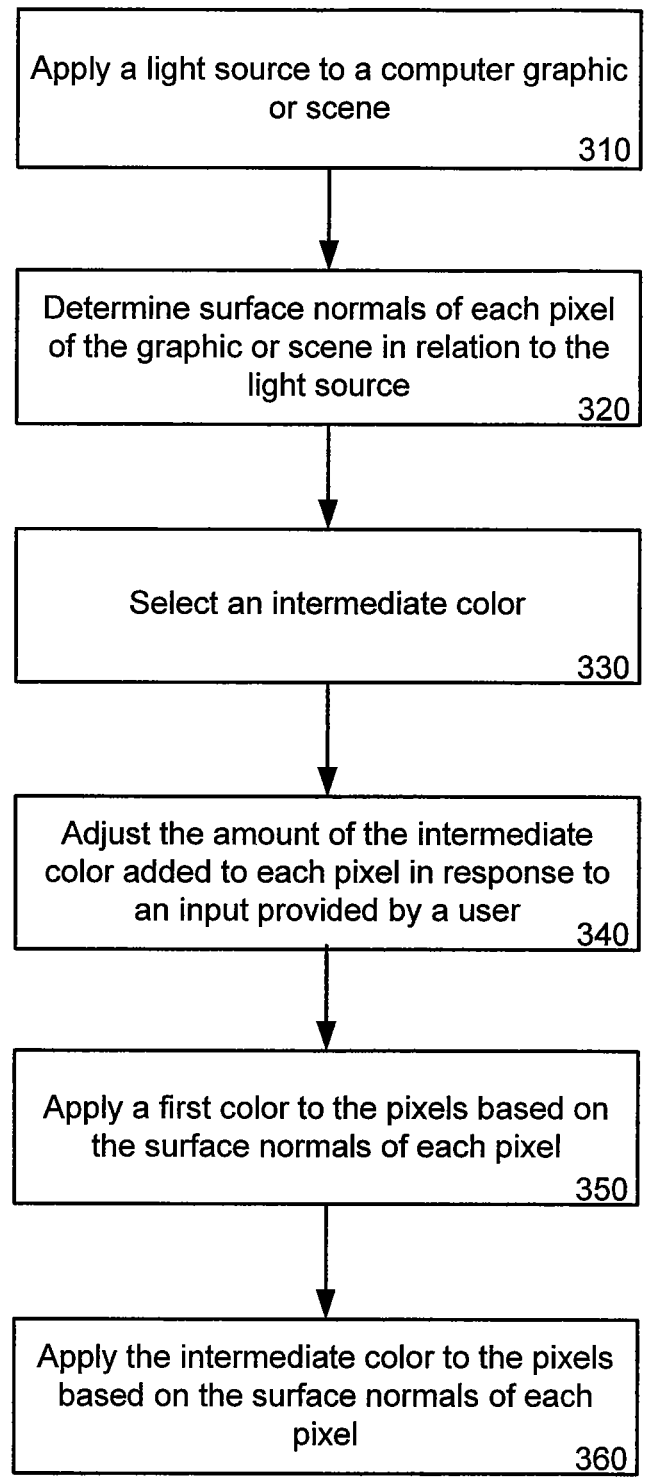
FIG. 3 is a flow chart illustrating another embodiment of the present disclosure of applying an intermediate color to a computer graphic.

FIG. 3 is a flow chart illustrating another embodiment of the present disclosure of applying an intermediate color to a computer graphic. The intermediate color may be applied to a computer graphic or scene to provide a more detailed and painterly look to the object or scene.

Beginning in operation 310, a light source may be selected and applied to the computer graphic or scene. The light source may not be an actual light source, but may merely be a lighting technique applied to the pixels of a computer graphic to provide definition and feel to the graphic. One example of a light source may be a point light, although any type of light source may be selected in the embodiment described. Once selected, a computer graphics rendering engine may apply the lighting technique to the graphic.

To apply the lighting technique, the rendering engine may determine the surface normal of each pixel of the graphic or scene in relation to the light source in operation 320. For example, a point light may be selected and applied to the scene at a 45 degree angle to the scene. Thus, in operation 320, the rendering engine may compute the surface normal of each pixel in relation to the placement of the point light source. Thus, the pixels may range from being perpendicular to the point light to being parallel to the point light. Also, some pixels may point away from the point light. Based on the surface angle of each pixel, the rendering image may apply color and shading to each pixel.

In operation 330, an intermediate color may be selected to be applied to the graphic. In one embodiment, the intermediate color may be selected based on an input provided by the designer of the graphic. In another embodiment, the intermediate color may be selected by a computer program, such as one operated by the rendering engine. Several parameters may be utilized in selecting the intermediate color, including, but not limited to, the intended effect of the combined colors, the closeness of the colors in the color spectrum and the look and feel of the overall combined colors. The intermediate color may be blended with the first color to provide a painterly look to the graphic.

In some embodiments, the amount of intermediate color applied to the graphic may be adjusted after the initial application of the color to the graphic, as in operation 340. The adjustment to the amount of intermediate color applied to each pixel may be in response to an input provided by a user. For example, the user may provide an input to apply less intermediate color to the graphic. In response to the input provided by the user, the rendering engine may adjust the amount of intermediate color ultimately blended with each pixel of the graphic. In one example, the rendering engine may provide an adjustable scale input that allows the user to manually adjust the amount of intermediate color applied to each pixel of the graphic. In another example, the rendering image may automatically adjust the amount of intermediate color added to each pixel based on parameters provided to the engine by a user.

In operation 350, a first color may be applied to each pixel based on the surface normal of that pixel. The first color may be related to the color of the point light selected by the graphic designer. For example, the graphic designer may select a yellow point light to simulate sunlight on the computer graphic or scene. Alternatively, the designer may select a purple or grey point light to simulate moonlight. However, it should be appreciated that any color may be selected as the first color by the designer to be applied to the computer graphic or scene.

In one embodiment that may be similar to the embodiments described above, the intensity or brightness of the first color may be applied to the pixels based on the surface normal of the pixels to the point light. In one example, pixels that have surface normals more parallel in relation to the point light may be brighter in color than those with a more perpendicular surface normals. Further, the pixels that have surface normals that point away from the point light may not receive any of the first color at all. Instead, an ambient light color may be applied to these pixels. This is but one example of how the first color may be apportioned within the pixels based on the surface normal of each pixel in relation to the point light. Any number of methods may be utilized to apply the first color the computer graphic or scene.

In operation 360, the selected intermediate color may be applied to the pixels of the computer graphic or scene based on the surface normal of each pixel calculated in operation 320. For example, the amount of intermediate color added to each pixel may be related to the calculated surface normal. Thus, pixels with surface normals that are parallel to the point light may have no or very little intermediate color added to the pixel. Those pixels with surface normals that are perpendicular to the point light may include a large amount of the intermediate color blended with the first color of the pixel. Thus, when combined with the first color applied to the graphic, pixels with surface normals that are parallel to the point light may be solely colored with the first color while pixels with perpendicular surface normals may be colored solely with the intermediate color. Those pixels with surface normals between these two may contain a blended combination of the first and intermediate color based on the surface normal of the pixel to the point light. Further, those pixels that point away from the light source may contain no percentage of the intermediate light, but may be colored by the ambient light color. The above example is but one way in which the intermediate color may be applied to the computer graphic or scene. Any method may be used to apply the intermediate color based on the calculated surface angle.

Figure 4:
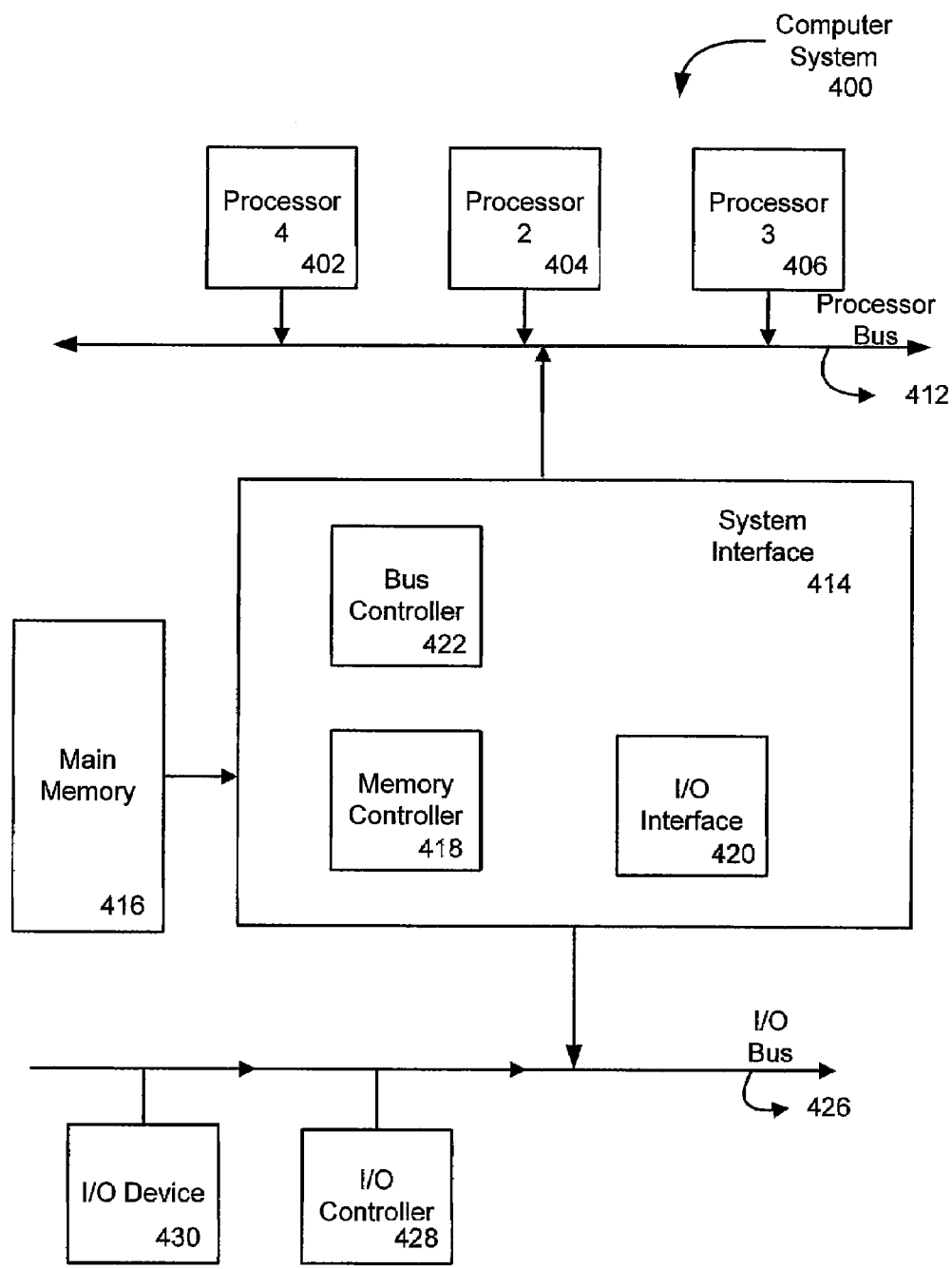
FIG. 4 is a block diagram illustrating an exemplary computer system which may be used in implementing embodiments of the present disclosure.

FIG. 4 is a block diagram illustrating an exemplary computer system which may be used in implementing embodiments of the present disclosure. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 414 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 430, as illustrated.

I/O device 430 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 404 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 416. Common forms of machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It should be noted that the flowchart of FIGS. 3 is illustrative only. Alternative embodiments of the present invention may add operations, omit operations, or change the order of operations without affecting the spirit and scope of the present invention.

The foregoing merely illustrates the principles of the invention. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the invention and are thus within the spirit and scope of the present invention. From the above description and drawings, it will be understood by those of ordinary skill in the art that the particular embodiments shown and described are for purposes of illustrations only and are not intended to limit the scope of the present invention. References to details of particular embodiments are not intended to limit the scope of the invention.

What is claimed is:

1. A method for applying color to a computer-rendered object, the method comprising:
   illuminating the computer-rendered object with a point light source having a first color and an ambient light source having a second color;
   calculating an angle between a surface normal of a first pixel of the computer-rendered object and a location of the point light source;
   where the calculated angle has a first value, applying the first color to the first pixel;
   where the calculated angle has a second value, blending a third color with the first color in the first pixel based on the calculated angle producing a blend color; and
   where the calculated angle has a third value, applying the second color to the first pixel.

2. The method of claim 1 wherein the blending operation further comprises:
   coloring the first pixel the third color when the calculated angle between the surface normal of the first pixel and the location of the light source is 90 degree.

3. The method of claim 1 wherein the blending operation further comprises:
   coloring the first pixel the first color when the calculated angle between the surface normal of the first pixel and the location of the light source is 0 degree.

4. The method of claim 1 further comprising;
   selecting the second color based on an input provided by a user.

5. The method of claim 1 further comprising:
   selecting the third color based on the proximity of the third color to the first color in the color spectrum.

6. The method of claim 1 further comprising:
   coloring the pixel the second color when the calculated angle is greater than 90 degrees.

7. The method of claim 1 further comprising:
   adjusting the level of the third color blended with the first color in the first pixel based on an input provided by a user.

8. The method of claim 1 wherein the computer-rendered object comprises a plurality of computer-generated objects and a computer-generated background.

9. A system for coloring a computer-rendered object or scene comprising:
   a non-transitory machine-readable medium having stored thereon data representing sequences of instructions that, when executed by a processor, cause the processor to perform operations comprising:
      illuminating the object or scene with a point light source having a first color and an ambient light having a second color;
      calculating an angle of a surface normal of a first pixel in relation to the location of the point light source; and
      where the calculated angle has a first value, applying the first color to the first pixel;
      where the calculated angle has a second value, blending a third color with the first color in the first pixel based on the calculated angle creating a blend color; and
      where the calculated angle has a third value, applying the second color to the first pixel.

10. The system of claim 9 wherein the sequences of instructions stored on the non-transitory machine-readable medium further causes the processor to perform operations comprising:
    selecting the second color based on a selection input provide by a user.

11. The system of claim 9 wherein the sequences of instructions stored on the non-transitory machine-readable medium further causes the processor to perform operations further comprising:
    adjusting the level of the second color blended with the first color in the first pixel based on a color adjusting input provided by a user.

12. The system of claim 9 wherein the sequences of instructions stored on the non-transitory machine-readable medium further causes the processor to perform operations further comprising:
    automatically selecting the second color based on the proximity of the second color to the first color in the color spectrum.

13. The system of claim 9 wherein the sequences of instructions stored on the non-transitory machine-readable medium further causes the processor to perform operations comprising:
    coloring the first pixel the third color when the calculated angle of the surface normal of the first pixel in relation to the location of the light source is 90 degrees.

14. The system of claim 9 wherein the sequences of instructions stored on the non-transitory machine-readable medium further causes the processor to perform operations comprising:
    coloring the first pixel the first color when the calculated angle of the surface normal of the first pixel in relation to the location of the light source is 0 degrees.

15. The system of claim 9 wherein the sequences of instructions stored on the non-transitory machine-readable medium further causes the processor to perform operations comprising:
    applying the second color to the first pixel when the calculated surface angle of the first pixel is greater than 90 degrees.

16. A non-transitory computer-readable storage medium, the computer readable storage medium storing a computer-executable code that, when executed by a computer, causes the computer to display a computer-rendered object, wherein the computer-rendered object is colored through the operations of:
    illuminating the computer-rendered object with a point light source having a first color and an ambient light source having a second color;
    calculating an angle between a surface normal of a first pixel of the computer-rendered object in relation to a location of the point light source;
    where the calculated angle has a first value, applying the first color to the first pixel;
    where the calculated angle has a second value, blending a third color with the first color in the first pixel based on the calculated angle producing a blend color; and
    where the calculated angle has a third value, applying the second color to the first pixel.

17. The non-transitory computer-readable storage medium of claim 16, wherein the computer-rendered object is further colored through the operation of:
    coloring the first pixel the third color when the calculated angle of the first pixel in relation to the location of the light source is 90 degrees.

18. The non-transitory computer-readable storage medium of claim 16, wherein the computer-rendered object is further colored through the operation of:
    coloring the first pixel the first color when the calculated surface angle of the first pixel in relation to the location of the light source is 0 degrees.

19. The non-transitory computer-readable storage medium of claim 16, wherein computer-rendered object is further colored through the operations of:
  applying the Second color to at least the second pixel when the calculated angle of the second pixel is greater than 90 degrees.

20. The non-transitory computer-readable storage medium of claim 16, wherein the computer-rendered object comprises a plurality of computer-generated objects and a computer-generated background.

21. A method for applying color to a computer-rendered object comprising:
  illuminating an object defined by a plurality of pixels with a point light source having a first color and an ambient light source having a second color;
  determining for each pixel within the plurality of pixels a pixel angle between a surface normal of the pixel and the point light source:
  where the pixel angle has a first value, coloring the pixel the first color;
  were the pixel angle has a second value, coloring the pixel a blend color, wherein the blend color is a combination of the first color and a third color;
  where the pixel angle has a third value, coloring the pixel the second color; wherein
  an intensity of the pixel when colored with the first color is greater than an intensity of the pixel when colored the blend color or the third color.

22. A method for applying color to a computer-rendered object comprising:
  illuminating an object defined by a plurality of pixels with a point light source having a first color and an ambient light source having a second color;
  determining for each pixel within the plurality of pixels a pixel angle between a surface normal of the pixel and the point light source:
  where the pixel angle has a first value, coloring the pixel the first color;
  where the pixel angle has a second value, coloring the pixel a blend color, wherein the blend color is a combination of the second color and a third color;
  where the pixel angle has a third value, coloring the pixel the second color.

* * * * *